(12) United States Patent
Kawamura (10) Patent No.: US 11,556,005 B2
(45) Date of Patent: Jan. 17, 2023

(54) HEAD-UP DISPLAY APPARATUS

(71) Applicant: JVCKENWOOD CORPORATION, Yokohama (JP)

(72) Inventor: Ken Kawamura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/115,393

(22) Filed: Dec. 8, 2020

(65) Prior Publication Data
US 2021/0088785 A1 Mar. 25, 2021

Related U.S. Application Data

(63) Continuation of application No. PCT/JP2019/009708, filed on Mar. 11, 2019.

(30) Foreign Application Priority Data

Sep. 28, 2018 (JP) .............................. JP2018-184079

(51) Int. Cl.
*G09G 5/00* (2006.01)
*B60K 35/00* (2006.01)
*G02B 27/01* (2006.01)
*G02B 27/48* (2006.01)

(52) U.S. Cl.
CPC .......... *G02B 27/0101* (2013.01); *B60K 35/00* (2013.01); *G02B 27/0179* (2013.01); *B60K 2370/1529* (2019.05); *G02B 2027/0187* (2013.01); *G02B 2027/0196* (2013.01)

(58) Field of Classification Search
CPC ............................. G02B 27/0101; B60K 35/00
See application file for complete search history.

(56) References Cited

U.S. PATENT DOCUMENTS

| 2012/0099032 A1* | 4/2012 | Ishikawa ............ G02B 27/0101 349/11 |
| 2014/0313586 A1* | 10/2014 | Jan ..................... G02B 27/0149 359/630 |
| 2016/0320616 A1 | 11/2016 | Ichii |
| 2018/0024359 A1 | 1/2018 | Yoneyama |
| 2019/0196188 A1 | 6/2019 | Hirata et al. |

FOREIGN PATENT DOCUMENTS

| JP | 2016-206612 A | 12/2016 |
| WO | 2018042844 A1 | 3/2018 |

\* cited by examiner

*Primary Examiner* — Nan-Ying Yang
(74) *Attorney, Agent, or Firm* — Procopio, Cory, Hargreaves & Savitch LLP (57) ABSTRACT

The head-up display apparatus includes a display-light emitting unit having a second inclination angle around the axis parallel to the vertical direction so that the first direction side thereof is closer to the user than the second direction side thereof is, and being configured to emit display light forming a rectangular image corresponding to the rectangular virtual image. The head-up display apparatus includes a reflecting mirror having a third inclination angle around the axis parallel to the vertical direction so that the first direction side thereof is closer to the user than the second direction side thereof is, and being configured to reflect the display light and emit reflected light to the virtual-image display unit.

6 Claims, 5 Drawing Sheets

HEAD-UP DISPLAY APPARATUS

CROSS REFERENCE TO RELATED APPLICATION

The present application is a Bypass Continuation of PCT/JP2019/009708 filed on Mar. 11, 2019, which is based upon and claims the benefit of priority from Japanese Patent Application No. 2018-184079, filed on Sep. 28, 2018, the disclosure of which are incorporated herein in its entirety by reference.

BACKGROUND

The present invention relates to a head-up display apparatus.

There is a head-up display apparatus for providing information to a driver of an automobile. The head-up display apparatus makes display light, which forms an image, incident on a virtual-image display unit, which lets light pass therethrough, so that a user visually recognizes a virtual image formed by the display light. Two types of head-up display apparatuses for automobiles have been known. That is, there are a type in which a virtual image is displayed on a dedicated combiner, and a type in which a virtual image is displayed on a windshield of an automobile. Of these types, in the case of the type in which a virtual image is displayed on a windshield of an automobile, since the windshield is not planar and is inclined with respect to a user, it is necessary to correct the virtual image to be displayed for the distortion caused by them. Therefore, a technique for correcting a virtual image for such a distortion has been proposed.

An image display apparatus disclosed in Patent Literature 1 (Japanese Unexamined Patent Application Publication No. 2016-206612) is an image display apparatus installed in a moving body, in which when the lateral direction of the moving body is defines as an X-direction and the vertical direction thereof is defined as a Y-direction, a projection image of an intermediate image onto an XY-plane forms a predetermined angle θ1 with respect to the X-direction, and a projection image of a tilt axis on the XY-plane forms an angle θ2 with respect to the X-direction.

SUMMARY

However, in the technique disclosed in Patent Literature 1, since the intermediate image is rotated around the longitudinal axis of the moving body, an intermediate-image forming apparatus that forms the intermediate image and a reflecting mirror that projects the intermediate image onto the windshield need to be disposed in a rotated manner around the longitudinal axis of the moving body. Therefore, it is difficult to reduce the sizes of the intermediate-image forming apparatus and the reflecting mirror in the vertical direction.

According to an embodiment, a head-up display apparatus is a head-up display apparatus capable of projecting a rectangular virtual image onto a virtual-image display unit disposed in front of a user in such a manner that a height of a left side of the rectangular virtual image as viewed from the user coincides with a height of a right side thereof. The virtual-image display unit has a first inclination angle around an axis parallel to a vertical direction so that a first direction side thereof is closer to the user than a second direction side thereof is, the first direction side being one of sides in a lateral direction as viewed from the user, the second direction side being the side opposite to the first direction side. The above-described head-up display apparatus includes a display-light emitting unit having a second inclination angle around the axis parallel to the vertical direction so that the first direction side thereof is closer to the user than the second direction side thereof is, the display-light emitting unit being configured to emit display light forming a rectangular image corresponding to the rectangular virtual image. Further, the head-up display apparatus includes a reflecting mirror having a third inclination angle around the axis parallel to the vertical direction so that the first direction side thereof is closer to the user than the second direction side thereof is, the reflecting mirror being configured to reflect the display light and thereby emit reflected light to the virtual-image display unit.

Note that, regarding the aforementioned "first direction side" and the "second direction side", one of the left and right sides of the user is referred to as the first direction side, and the other side different from the first direction is referred to as the second direction.

According to the embodiment, it is possible to provide a head-up display apparatus having a reduced size in the vertical direction.

DETAILED DESCRIPTION

For clarifying the explanation, the following description and the drawings are partially omitted and simplified as appropriate. The same symbols are assigned to the same elements throughout the drawings and redundant explanations are omitted as appropriate.

Embodiment

A head-up display apparatus 1 according to an embodiment will be described hereinafter with reference to the drawings. The head-up display apparatus 1 is an apparatus that displays an arbitrary virtual image for a driver of an automobile. As the head-up display apparatus 1 displays an arbitrary virtual image, the automobile equipped with the head-up display apparatus 1 can present certain information to the driver as appropriate.

Figure 1:
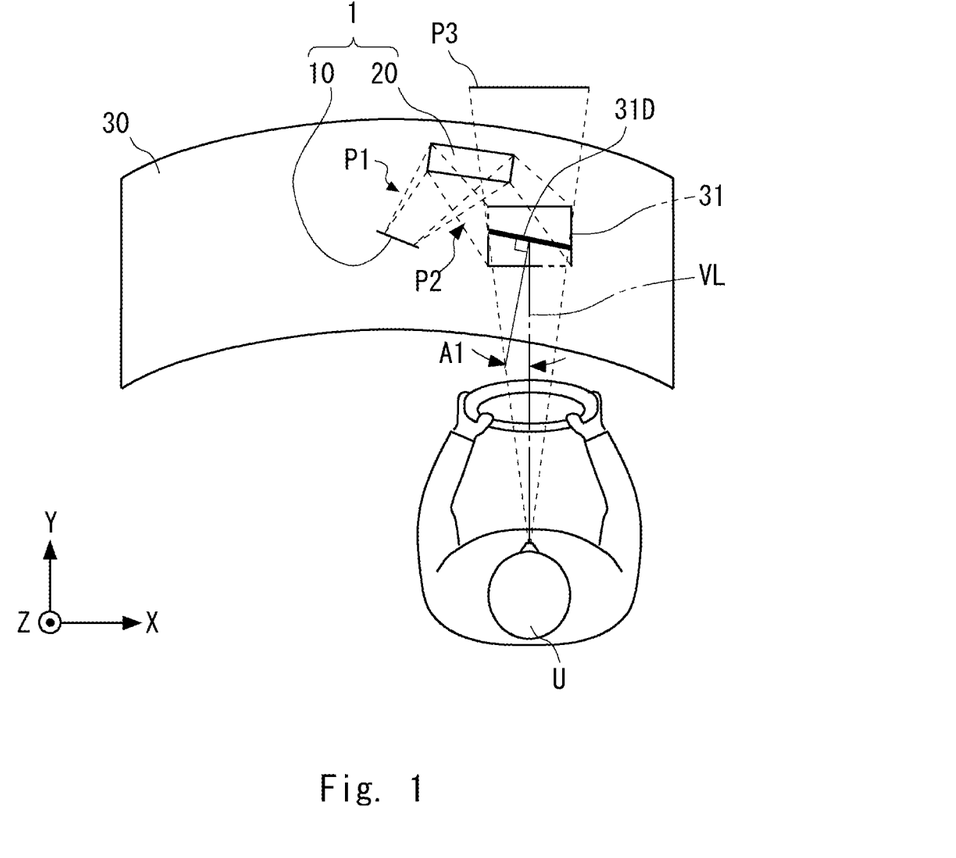
FIG. 1 is a top view of a head-up display apparatus according to an embodiment.

A configuration of the head-up display apparatus 1 will be described with reference to FIG. 1. FIG. 1 is a top view of the head-up display apparatus according to the embodiment. The head-up display apparatus 1 mainly includes a display-light emitting unit 10 and a reflecting mirror 20. The head-up display apparatus 1 is installed in an automobile and configured to project a virtual image on a windshield 30 of the automobile equipped with the head-up display apparatus 1.

Note that in the drawings for explaining this embodiment, a right-handed orthogonal coordinate system is shown for the sake of convenience for explaining a positional relation among components. In FIGS. 1 to 5, the X-, Y- and Z-axis directions of the orthogonal coordinate systems in these drawings coincide with each other. In FIG. 1, the X-axis coincides with the lateral direction of the automobile and a user U, and the X-axis positive direction is the rightward of the automobile and the user U. The Y-axis coincides with the longitudinal direction (i.e., the front-back direction) of the automobile and the user U, and the Y-axis positive direction is the forward of the automobile and the user U. The Z-axis coincides with the vertical direction of the automobile and the user U, and the Z-axis positive direction is the upward of the automobile and the user U.

The display-light emitting unit 10 has a function of emitting display light P1 that forms a rectangular image. The display-light emitting unit 10 mainly includes, for example, a light source unit and an image combining unit that has a rectangular opening and combines an image with light received from the light source unit. The light source unit includes, for example, an LED(s), a semiconductor laser(s), or a lamp(s). The image combining unit is, for example, a transmission-type liquid crystal panel, a reflection-type liquid crystal panel, or a MEMS mirror. The display light P1 emitted from the display-light emitting unit 10 is applied to the reflecting mirror 20.

The reflecting mirror 20 receives the display light P1 from the display-light emitting unit 10, reflects the received display light P1, and thereby emits the reflected light as reflected light P2. The reflecting mirror 20 is a concave mirror having a free-form surface. The concave mirror acts as a magnifying mirror, and the free-form surface shape of the reflecting mirror 20 is designed so as to minimize the distortion of the virtual image that the user U visually recognizes. That is, the reflecting mirror 20 has a function of correcting the virtual image for the distortion thereof. The reflected light P2 is applied to the windshield 30.

The windshield 30 of the automobile is a windbreak glass plate disposed in the front part of the automobile. The windshield 30 includes a virtual-image display unit 31. The virtual-image display unit 31 is disposed in front of the user U. When visible light is incident at a predetermined incident angle, the virtual image display unit 31 reflects the reflected light P2 received from the reflecting mirror 20 and thereby forms an image formed by the reflected light on the retina of the user U. In this way, the head-up display apparatus 1 makes the user U recognize the display light P1 emitted from the display-light emitting unit 10 as a virtual image P3. That is, the virtual-image display unit 31 displays a virtual image on the incidence plane on which the reflected light P2 is incident.

Next, each of the components of the head-up display apparatus 1 and a positional relation with the windshield 30 will be described. In the drawing, the user U, who is the driver, sits on a driver seat provided on the right side of the automobile. Further, the head-up display apparatus 1 is positioned so that the user U can view the virtual image while sitting on the driver seat.

Further, as shown in the drawing, the windshield 30 is formed in a gentle bow-like shape, and its central part projects forward. Therefore, the virtual-image display unit 31 provided in the windshield 30 disposed in front of the user U, who sits on the right side of the automobile, is inclined so that the right side (the X-axis positive side) thereof is closer to the user U than the left side (the X-axis negative side) thereof is. Note that either of the left side (the X-axis negative side) and the right side (the X-axis positive side) may be referred to as a first direction side, and the other side different from the first direction may be referred to as a second direction.

The aforementioned inclination will be described hereinafter in detail. In the drawing, a line segment 31D schematically shows a cross-sectional shape of the virtual-image display unit 31 on the XY-plane. Meanwhile, the line of sight VL of the user U in a state in which the user U looks straight at the virtual image P3 is parallel to the Y-axis. As shown in the drawing, the line of sight VL of the user U and a line perpendicular to the line segment 31D form an angle A1. That is, in this embodiment, the inclination of the virtual-image display unit 31 is the angle A1. Note that the angle A1 is also referred to as a first inclination angle.

The virtual-image display unit 31 is inclined around the axis parallel to the vertical direction of the user U (i.e., around the Z-axis) as described above, and the reflecting mirror 20 is positioned so that the light beam of the virtual image which is generated as the virtual-image display unit 31 reflects the reflected light P2 coincides with the line of sight VL. Therefore, the reflecting mirror 20 is disposed on the left side of the virtual-image display unit 31 according to the inclination of the virtual-image display unit 31.

Further, the reflecting mirror 20 emits the reflected light P2 toward the virtual-image display unit 31 which is disposed on the right side in the drawing. Therefore, the display light P1 emitted from the display-light emitting unit 10 is adjusted so as to be incident on the reflecting mirror 20 from the left side of the reflecting mirror 20. Therefore, the components are arranged, from the negative side to the positive side in the X-axis direction, in the order of the display-light emitting unit 10, the reflecting mirror 20, and the virtual-image display unit 31. In other words, in the head-up display apparatus 1, the display-light emitting unit 10 and the reflecting mirror 20 are disposed on the side close to the end on the side far from the user U according to the inclination of the virtual-image display unit 31.

Figure 2:
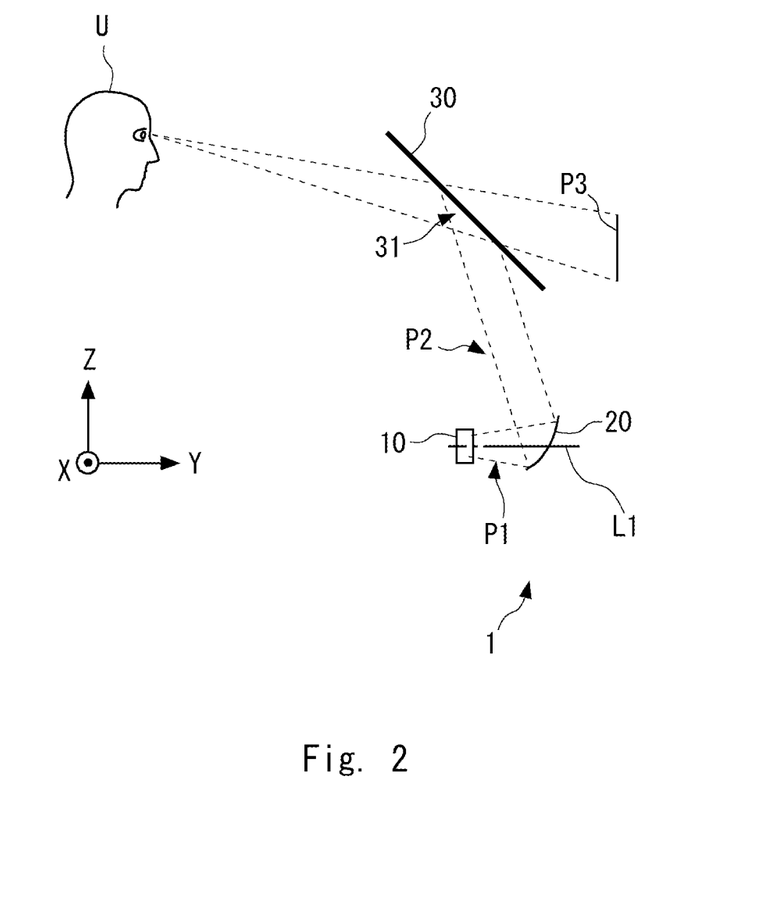
FIG. 2 is a side view of a head-up display apparatus according to an embodiment.

Next, each of the components of the head-up display apparatus 1 and the positional relation with the windshield 30 will be further described with reference to FIGS. 2 and 3. FIG. 2 is a side view of the head-up display apparatus according to the embodiment. As shown in the drawing, in the head-up display apparatus 1, the display-light emitting unit 10 and the reflecting mirror 20 are disposed below the windshield 30. Further, the display-light emitting unit 10 is disposed relatively behind the reflecting mirror 20 (in the Y-axis negative direction), and the reflecting mirror 20 is disposed relatively in front of the display-light emitting unit 10 (in the Y-axis positive direction).

Figure 3:
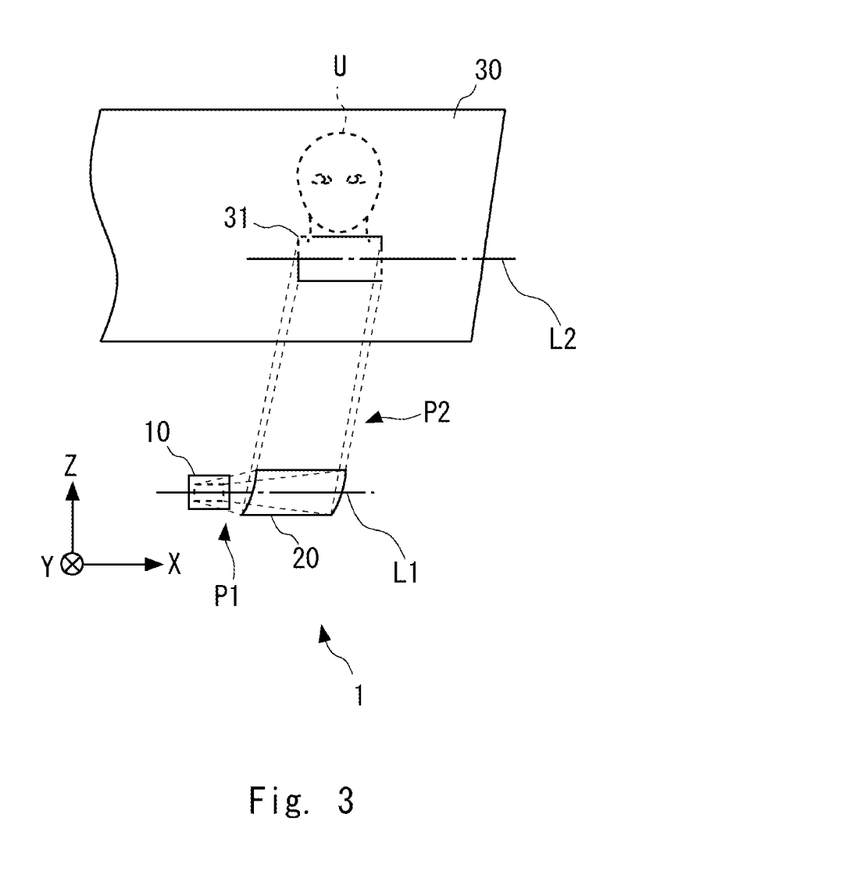
FIG. 3 is a front view of a head-up display apparatus according to an embodiment.

FIG. 3 is a front view of the head-up display apparatus according to the embodiment. As shown in FIGS. 2 and 3, the display-light emitting unit 10 and the reflecting mirror 20 are arranged parallel to the XY-plane. Regarding the display light P1 emitted from the display-light emitting unit 10, the arrangement of pixels of the rectangular image in the lateral direction is parallel to the XY-plane. In other words, the height of the left side in the rectangular image coincides with the height of the right side thereof. Further, a line L1 shown in the drawing indicates the emitting direction of the display light P1 emitted from the display-light emitting unit 10 at the center thereof in the vertical direction (in the Z-axis direction). The line L1 is parallel to the XY-plane. That is, the display-light emitting unit 10 emits the display light P1, which forms the rectangular image in which the arrangement of pixels in the lateral direction is parallel to the XY-plane, in the direction parallel to the XY-plane.

When the reflecting mirror 20 receives the display light P1, which forms the rectangular image in which the arrangement of pixels in the lateral direction is parallel to the XY-plane, it emits the reflected light P2 to the virtual-image display unit 31 while maintaining the state in which the arrangement of pixels in the lateral direction is parallel to the XY-plane. That is, the position and the shape of the free-form surface of the reflecting mirror 20 are configured so that the inclination of the reflected light P2 around the Y-axis (around the axis parallel to the longitudinal direction (i.e., the front/back direction) of the user) is parallel to the inclination of the rectangular virtual image around the Y-axis.

Further, in FIG. 3, a line L2 is a straight line parallel to the arrangement of pixels in the lateral direction in the rectangular virtual image projected onto the virtual-image display unit 31. The line L2 is parallel to the XY-plane. That is, by the configuration of the display-light emitting unit 10 and the reflecting mirror 20 described above, the head-up display apparatus 1 projects a rectangular virtual image onto the virtual-image display unit 31 in such a manner that the height of the left side of the rectangular virtual image as viewed from the user coincides with the height of the right side thereof. By the above-described configuration, the head-up display apparatus 1 can reduce the sizes of the display-light emitting unit 10 and the reflecting mirror 20 in the vertical direction.

Figure 4:
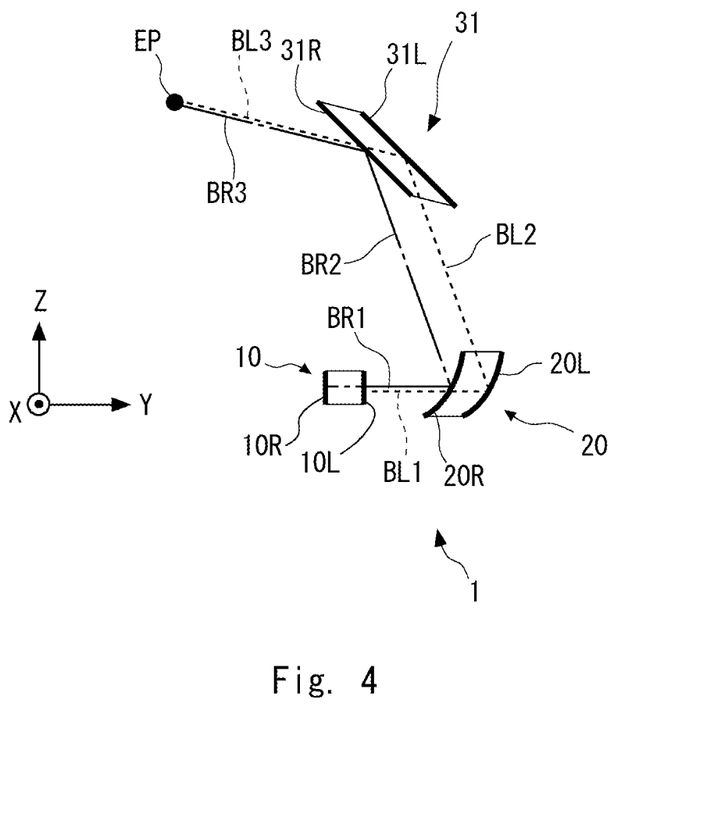
FIG. 4 is a side view schematically showing an optical path at the left end of a head-up display apparatus and an optical path at the right end thereof.
Figure 5:
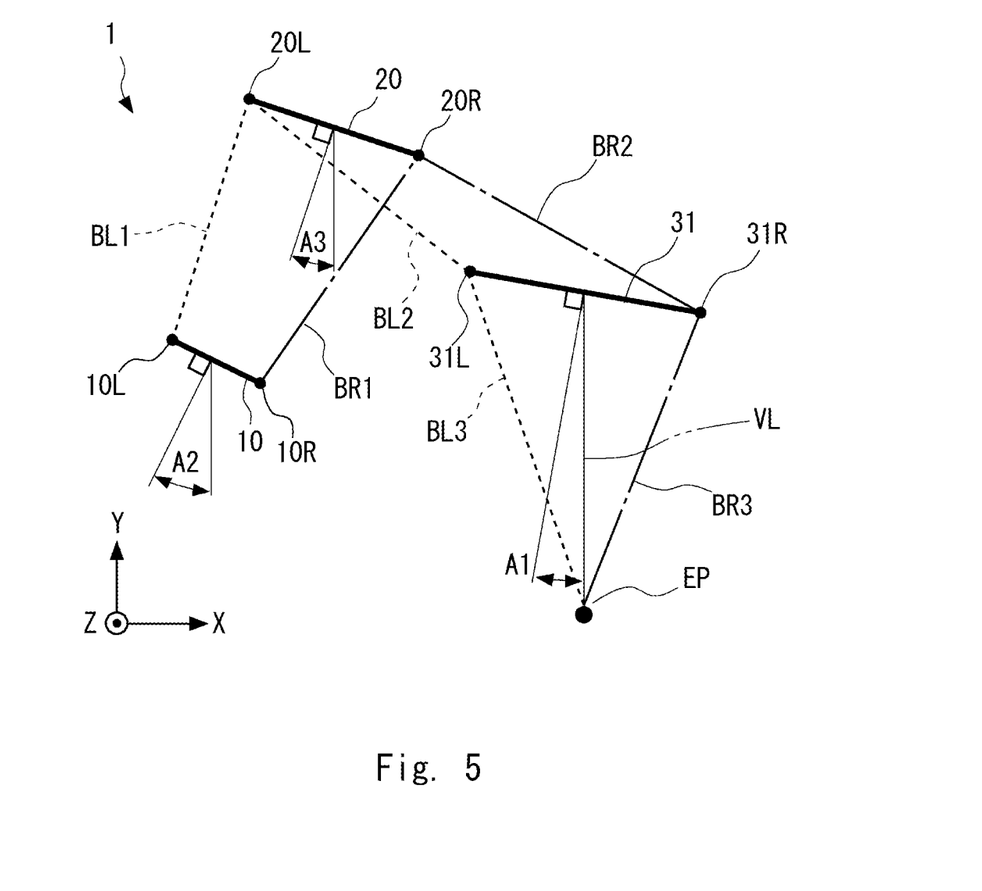
FIG. 5 is a top view schematically showing an optical path at the left end of a head-up display apparatus and an optical path at the right end thereof.

Next, the inclination of each of the display-light emitting unit 10, the reflecting mirror 20, and the virtual-image display unit 31 will be described with reference to FIGS. 4 and 5. FIG. 4 is a side view schematically showing an optical path at the left end of the head-up display apparatus and an optical path at the right end thereof. FIG. 5 is a top view schematically showing the optical path at the left end of the head-up display apparatus and the optical path at the right end thereof. In each of FIGS. 4 and 5, a left end 10L and a right end 10R of the display-light emitting unit 10, a left end 20L and a right end 20R of the reflecting mirror 20, a left end 31L and a right end 31R of the virtual-image display unit 31, and an eye point EP corresponding to the eye(s) of the user are shown.

Further, in FIGS. 4 and 5, a light beam at the left end of the light emitted from the display-light emitting unit 10 as viewed from the user is indicated by dotted lines. That is, the head-up display apparatus 1 emits a light beam BL1 from a position at an arbitrary height at the left end of the display-light emitting unit 10 to the reflecting mirror 20. The left end 20L of the reflecting mirror 20 reflects the light beam BL1 and thereby emits the reflected light as a light beam BL2 to the virtual-image display unit 31. The left end 31L of the virtual-image display unit 31 receives the light beam BL2 and emits a light beam BL3 to the eye point EP of the user.

Similarly, in FIGS. 4 and 5, a light beam at the right end of the light emitted from the display-light emitting unit 10 as viewed from the user is indicated by alternate long and short dash lines. That is, the head-up display apparatus 1 emits a light beam BR1 from a position at the right end of the display-light emitting unit 10 that is located at the same height as that of the position where the light beam BL1 is emitted. The right end 20R of the reflecting mirror 20 reflects the light beam BR1 and thereby emits the reflected light as a light beam BR2 to the virtual-image display unit 31. The right end 31R of the virtual-image display unit 31 receives the light beam BR2 and emits a light beam BR3 to the eye point EP. Note that although the light beams BL1 and BR1 are shifted from each other in the Z-axis direction in FIG. 4, they are shifted in order to make understanding of the drawing easier. That is, in practice, they may coincide with each other in the Z-axis direction. The same applies to the light beams BL3 and BR3.

Note that the sum total of the length of the light beam BL1, the length of the light beam BL2, and the length of the light beam BL3 is the length of the optical path from the left end of the display-light emitting unit 10 to the eye point EP. Further, the sum total of the length of the light beam BR1, the length of the light beam BR2, and the length of the light beam BR3 is the length of the optical path from the right end of the display-light emitting unit 10 to the eye point EP. In this embodiment, the head-up display apparatus 1 is configured so that the length of the optical path from the left end of the display-light emitting unit 10 to the eye point EP is substantially equal to the length of the optical path from the right end of the display-light emitting unit 10 to the eye point EP. Note that the expression "substantially equal" means that, for example, a difference of about 10% is allowed. Since the head-up display apparatus 1 is configured so that the lengths of the optical paths from both ends of the display-light emitting unit 10 to the eye point EP are equal to each other as described above, in the head-up display apparatus 1, each of the pixels of the virtual image viewed by the user is displayed without being blurred.

Next, the inclination of each of the display-light emitting unit 10 and the reflecting mirror 20 will be described. FIG. 5 shows an angle A1 of the inclination of the virtual-image display unit 31. The angle A1 of the virtual-image display unit 31 has already been described above with reference to FIG. 1. Further, the display-light emitting unit 10 is inclined so that the right end 10R (the X-axis positive side) is closer to the user than the left end 10L (the X-axis negative side) is. That is, the display-light emitting unit 10 has an angle A2 with respect to the Y-axis. Alternatively, it can be expressed that the display-light emitting unit 10 has the angle A2 around an axis parallel to the vertical direction (i.e., around the Z-axis). Note that the angle A2 is also referred to as a second inclination angle. Further, the reflecting mirror 20 is inclined so that the right end 20R (the X-axis positive side) is closer to the user than the left end 20L (the X-axis negative side) is. That is, the reflecting mirror 20 has an angle A3 with respect to the Y-axis. Alternatively, it can be expressed that the reflecting mirror 20 has the angle A3 around an axis parallel to the vertical direction (around the Z-axis). Note that the angle A3 is also referred to as a third inclination angle.

The reflecting mirror 20 is positioned so as to form a rectangular virtual image in which the reflected light is not inclined in the lateral direction as viewed from the user (the height of the reflected light on the left side coincides with that on the right side). Further, the angle A3 of the reflecting mirror 20 is set so that the length of the optical path from the display-light emitting unit to the eye point of the user U corresponding to the left end of the rectangular image is equal to the length of the optical path from the display-light emitting unit to the eye point of the user U corresponding to the right end of the rectangular image. That is, the reflecting mirror 20 is positioned so that the angle A3 increases as the angle A1 of the virtual-image display unit 31 increases. The angle A2 of the display-light emitting unit 10 is set according to the angle A1 of the virtual-image display unit 31 and the angle A3 of the reflecting mirror 20.

The embodiments have been described above. In the head-up display apparatus 1 according to the embodiment described above, the display-light emitting unit 10 and the reflecting mirror 20 have inclination angles so that one of the sides in the lateral direction is closer to the user than the other side is. Further, the direction of the inclination coincides with the direction of the inclination angle of the virtual-image display unit 31. Further, the second inclination angle (the angle A2) of the display-light emitting unit 10 and the third inclination angle (the angle A3) of the reflecting mirror 20 are set so that the lengths of the optical paths of the pixels are equal to each other. By the above-described configuration, the head-up display apparatus 1 can display a rectangular virtual image without increasing the size thereof in the vertical direction, e.g., without rotating components around the Y-axis. Therefore, there is an advantage that, when a dashboard of an automobile is designed, the constraints in the vertical direction are relaxed and hence the degree of freedom in the design is increased. As described above, according to this embodiment, it is possible to provide a head-up display apparatus having a reduced size in the vertical direction without worsening the distortion of the virtual image.

Note that the present invention is not limited to the above-described embodiments, and they may be modified as appropriate without departing from the spirit and scope of the invention. For example, the head-up display apparatus 1 may have an adjustment mechanism for rotating the display-light emitting unit 10 or the reflecting mirror 20 around the vertical axis. By having the adjustment mechanism, it is possible to correct the virtual image for the distortion thereof even after the head-up display apparatus 1 is installed. Further, the application of the head-up display apparatus 1 is not limited to moving bodies. That is, the head-up display apparatus 1 can be applied to various cases in which a virtual-image is projected to a virtual-image display unit that is inclined so that one of the sides in the lateral direction as viewed from a user is closer to the user side than the other side is. Specifically, the head-up display apparatus 1 may be applied to a driving simulation apparatus for an automobile, a flight simulator for an airplane, a video game, or the like.

What is claimed is:

1. A head-up display apparatus having a first inclination angle around an axis parallel to a vertical direction so that one side of a lateral direction is closer to a line of sight of user than an other side of the lateral direction is, the one side of a lateral direction being one of sides in the lateral direction as viewed from the line of sight of user, the other side of the lateral direction being the side opposite to the one side of a lateral direction, and the head-up display apparatus being capable of projecting a rectangular virtual image onto a virtual-image display unit disposed in front of the line of sight of user in such a manner that a height of a left side of the virtual image as viewed from the line of sight of user coincides with a height of a right side thereof, the head-up display apparatus comprising:
a display-light emitting unit having a second inclination angle around the axis parallel to the vertical direction so that the first direction side thereof is closer to the line of sight of user than the second direction side thereof is, the display-light emitting unit being configured to emit display light forming a rectangular image corresponding to the rectangular virtual image; and
a reflecting mirror having a third inclination angle around the axis parallel to the vertical direction so that the one side of a lateral direction thereof is closer to the line of sight of user than the other side of the lateral direction thereof is, the reflecting mirror being configured to reflect the display light and thereby emit reflected light to the virtual-image display unit, wherein, in all from the first inclination angle to the third inclination angle, a same one side of a lateral direction is closer than the other side of the lateral direction, and the first inclination angle to the third inclination angle are tilted in a same direction, and wherein the second inclination angle and the third inclination angle are set such that lengths of optical paths of pixels are equal to each other.

2. The head-up display apparatus according to claim 1, wherein the display-light emitting unit is positioned so that an inclination of the rectangular image around an axis parallel to a longitudinal direction thereof is parallel to an inclination of the rectangular virtual image around the axis parallel to the longitudinal direction thereof.

3. The head-up display apparatus according to claim 1, wherein the reflecting mirror is positioned so that an inclination of the reflected light around an axis parallel to a longitudinal direction is parallel to an inclination of the rectangular virtual image around the axis parallel to the longitudinal direction.

4. The head-up display apparatus according to claim 1, wherein the third inclination angle of the reflecting mirror is set according to the first inclination angle of the virtual-image display unit so that the reflected light forms the rectangular virtual image, and wherein the display-light emitting unit, the reflecting mirror, and virtual-image display unit are tilted around an axis parallel to the vertical direction.

5. The head-up display apparatus according to claim 1, wherein the second inclination angle of the display-light emitting unit and the third inclination angle of the reflecting mirror are set so that a length of an optical path from the display-light emitting unit to an eye point of the user corresponding to a left end of the rectangular image is equal to a length of an optical path from the display-light emitting unit to the eye point of the user corresponding to a right end of the rectangular image.

6. A head-up display apparatus having a first inclination angle around an axis parallel to a vertical direction so that one side of a lateral direction is closer to a line of sight of user than an other side of the lateral direction is, the one side of a lateral direction being one of sides in the lateral direction as viewed from the line of sight of user, the other side of the lateral direction being the side opposite to the one side of a lateral direction, and the head-up display apparatus being capable of projecting a rectangular virtual image onto a virtual-image display unit disposed in front of the line of sight of user in such a manner that a height of a left side of the virtual image as viewed from the line of sight of user coincides with a height of a right side thereof, the head-up display apparatus comprising:
a display-light emitting unit having a second inclination angle around the axis parallel to the vertical direction so that the first direction side thereof is closer to the line of sight of user than the second direction side thereof is, the display-light emitting unit being configured to emit display light forming a rectangular image corresponding to the rectangular virtual image; and
a reflecting mirror having a third inclination angle around the axis parallel to the vertical direction so that the one side of a lateral direction thereof is closer to the line of sight of user than the other side of the lateral direction thereof is, the reflecting mirror being configured to reflect the display light and thereby emit reflected light to the virtual-image display unit, wherein, in all from the first inclination angle to the third inclination angle, a same one side of a lateral direction is closer than the other side of the lateral direction, and the first inclination angle to the third inclination angle are tilted in a same direction, and wherein the second inclination angle of the display-light emitting unit and the third inclination angle of the reflecting mirror are set so that a length of an optical path from the display-light emitting unit to an eye point of the user corresponding to a left end of the rectangular image is equal to a length of an optical path from the display-light emitting unit to the eye point of the user corresponding to a right end of the rectangular image.

* * * * *